(12) United States Patent
Keitsch et al.

(10) Patent No.: US 12,463,232 B2
(45) Date of Patent: Nov. 4, 2025

(54) SINGLE CELL AND FUEL CELL STACK WITH ELASTIC STRUCTURES FOR EQUAL DISTRIBUTION OF OPERATING MEDIA

(71) Applicant: AUDI AG, Ingolstadt (DE)

(72) Inventors: Oliver Keitsch, Heilbronn (DE); Nico Riede, Stuttgart (DE); Armin Siebel, Neckarsulm (DE); Sebastian Voigt, Heilbronn (DE)

(73) Assignee: AUDI AG, Ingolstadt (DE)

( * ) Notice: Subject to any disclaimer, the term of this patent is extended or adjusted under 35 U.S.C. 154(b) by 365 days.

(21) Appl. No.: 18/003,136

(22) PCT Filed: Oct. 25, 2021

(86) PCT No.: PCT/EP2021/079487
§ 371 (c)(1),
(2) Date: Dec. 22, 2022

(87) PCT Pub. No.: WO2022/090128
PCT Pub. Date: May 5, 2022

(65) Prior Publication Data
US 2023/0261239 A1    Aug. 17, 2023

(30) Foreign Application Priority Data
Oct. 30, 2020   (DE) .................... 10 2020 128 559.0

(51) Int. Cl.
*H01M 8/2483* (2016.01)
*H01M 8/0273* (2016.01)
(Continued)

(52) U.S. Cl.
CPC ....... *H01M 8/2483* (2016.02); *H01M 8/0273* (2013.01); *H01M 8/1004* (2013.01);
(Continued)

(58) Field of Classification Search
CPC .. H01M 8/2483; H01M 8/0273; H01M 8/242; H01M 8/2457; H01M 8/1004; H01M 2008/1095
(Continued)

(56) References Cited

U.S. PATENT DOCUMENTS

2011/0165492 A1    7/2011  Wagner et al.

FOREIGN PATENT DOCUMENTS

| DE | 112008000553 T5 | 2/2010 |
| DE | 102014220682 A1 | 4/2016 |

(Continued)

OTHER PUBLICATIONS

International Search Report, mailed Feb. 4, 2022, for International Patent Application No. PCT/EP2021/079487. (2 pages).
(Continued)

*Primary Examiner* — Kevin P Kerns
(74) *Attorney, Agent, or Firm* — Seed Intellectual Property Law Group LLP

(57) ABSTRACT

A single cell for a fuel cell stack is provided, having a membrane electrode assembly arranged in an active region, being associated with at least one single plate, which is formed with a flow field to supply an operating medium to the active region of the membrane electrode assembly, which is fluidically connected to a media port present on the side away from the active region. Lateral with respect to the membrane electrode assembly there is a lamella at least partly covering the flow cross section of the media port, which is formed to be elastically bendable by the force of a reaction medium flowing axially through the media port in order to change the useful flow cross section of the media port. A fuel cell stack having a plurality of such single cells is also provided.

10 Claims, 3 Drawing Sheets

(51) Int. Cl.
  *H01M 8/1004* (2016.01)
  *H01M 8/242* (2016.01)
  *H01M 8/2457* (2016.01)
  *H01M 8/10* (2016.01)
(52) U.S. Cl.
  CPC ......... *H01M 8/242* (2013.01); *H01M 8/2457* (2016.02); *H01M 2008/1095* (2013.01)
(58) Field of Classification Search
  USPC ........................................................ 429/457
  See application file for complete search history.

(56) References Cited

FOREIGN PATENT DOCUMENTS

| | | |
|---|---|---|
| DE | 102017202705 A1 | 8/2018 |
| DE | 102017211755 A1 | 1/2019 |
| EP | 3336949 A1 | 6/2018 |
| JP | 2014002920 A | 1/2014 |

OTHER PUBLICATIONS

Written Opinion of the International Searching Authority, mailed Feb. 4, 2022, for International Patent Application No. PCT/EP2021/079487. (7 pages).

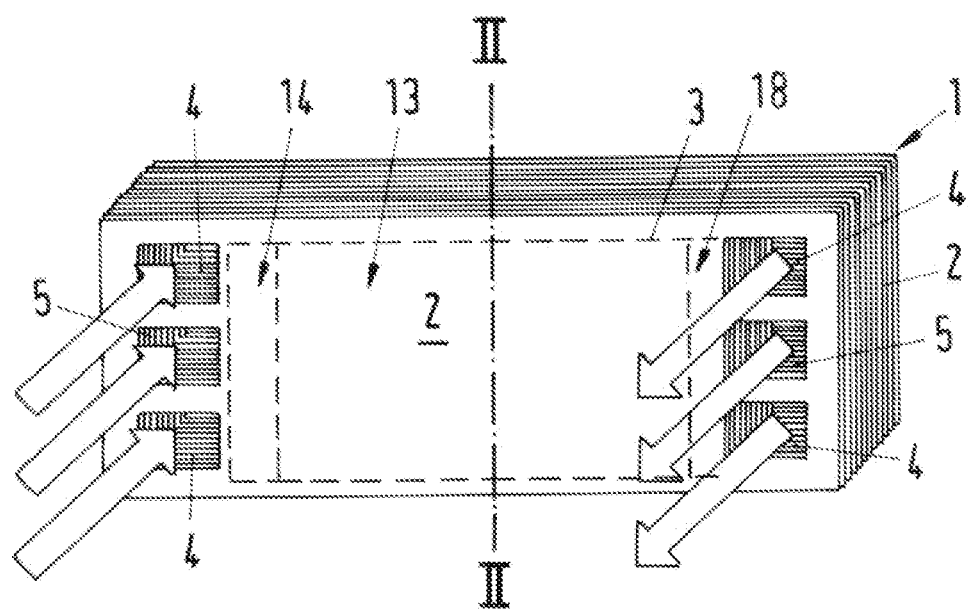
Fig.1
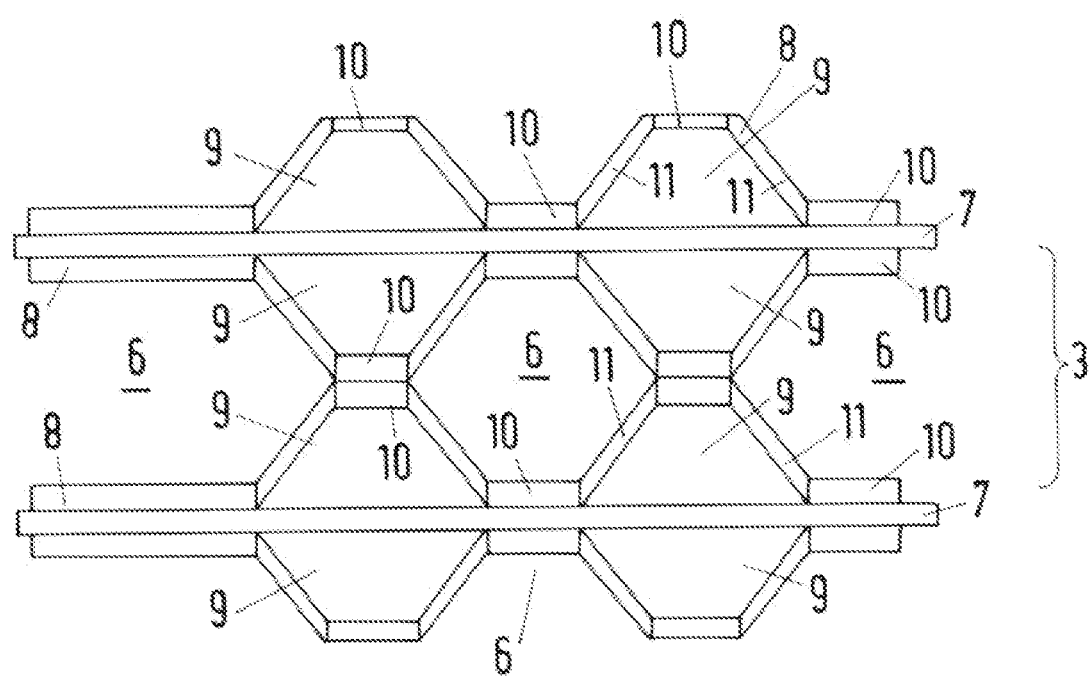
Fig.2 II-II

SINGLE CELL AND FUEL CELL STACK WITH ELASTIC STRUCTURES FOR EQUAL DISTRIBUTION OF OPERATING MEDIA

BACKGROUND

Technical Field

This disclosure relates to a single cell for a fuel cell stack. A membrane electrode assembly is arranged in an active region of the single cell, being associated with at least one single plate, but preferably a bipolar plate composed of two single plates joined together. The single plate is formed with a flow field to supply an operating medium to the active region of the membrane electrode assembly, which is fluidically connected in turn to a media port present on the side away from the active region. A plurality of stacked and flush oriented media ports form a main duct for the operating media, especially the cathode gas, the fuel or the coolant. Moreover, the invention relates to a fuel cell stack having a plurality of stacked single cells.

DESCRIPTION OF THE RELATED ART

Fuel cell devices are used for the chemical transformation of a fuel with oxygen to form water in order to create electric energy. For this, fuel cells contain as their key component the so-called membrane electrode assembly (MEA), which is an assemblage of a proton-conducting membrane and an electrode arranged on either side of the membrane (anode and cathode). Furthermore, gas diffusion layers (GDL) may be arranged on either side of the membrane electrode unit at the sides of the electrodes facing away from the membrane. In operation of the fuel cell device having a plurality of fuel cells assembled into a fuel cell stack, the fuel, especially hydrogen $H_2$ or a gas mixture containing hydrogen, is supplied to the anode, where an electrochemical oxidation of $H_2$ to $H^+$ takes place, giving off electrons. Through the electrolyte or the membrane which separates the reaction spaces from each other and electrically insulates them, a transport of the protons $H^+$ from the anode space to the cathode space occurs. The electrons provided at the anode are taken by an electrical line to the cathode. The cathode is supplied with oxygen or a gas mixture containing oxygen, so that a reduction of $O_2$ to $O^{2-}$ occurs, taking up electrons. At the same time, these oxygen anions react in the cathode space with the protons transported across the membrane to form water.

The reactant gases are supplied to the electrodes of the fuel cells by means of bipolar plates. In addition to the reactant gases, a cooling medium is also taken through the bipolar plates on account of the heat generated during the fuel cell reaction, so that three different media are taken through the bipolar plates in the smallest of spaces.

When supplying the fuel cells with the reactants, these are taken by main ducts (ports) to the bipolar plates, which is supposed to bring about a distribution of the reactants in an active region, in order to supply the entire surface of the electrodes as evenly as possible by means of a flow field. Since multiple bipolar plates are stacked with the membrane electrode units in the fuel cell stack, seals are used in order to seal off the main ducts along the fuel cell stack. In addition, a good sealing effect against the cooling medium flowing in coolant ducts must occur.

In order to produce an even distribution of the operating media brought into the stack, DE 10 2017 202 705 A1, DE 10 2014 220 682 A1 and DE 10 2017 211 755 A1 propose the use of inlay or insert elements in the main ducts, which alter the useful flow cross section along the lengthwise extension of the particular main duct. In this way, a uniform pressure and thus flow distribution of the operating media can be achieved. Through the use of inlay or insert elements, the bipolar plates can be formed with the same dimensions, so that the number of equal parts is increased, which results in a cost lowering.

However, the alternative exists of having the media ports of the bipolar plates formed with different flow cross sections, where for example the flow cross section of the main outlet ducts is chosen to be larger than the flow cross section of the main inlet ducts. The larger cross section at the outlet side slows down the flow velocity and increases the pressure in the outlet, which influences the equal distribution. On account of the resulting asymmetry of the single cells, a lot of design space is needed for the fuel cell stack so formed, and also the bracing of the single cells for the fuel cell stack is subject to an asymmetrical force distribution, which has to be equalized.

BRIEF SUMMARY

Embodiments of the present invention provide a single cell and a fuel cell stack which deals with at least one of the aforementioned drawbacks.

The bipolar plate according to an embodiment of the invention is characterized in particular in that lateral with respect to the membrane electrode assembly there is a lamella at least partly covering the flow cross section of the media port, which is formed to be elastically bendable or elastically resilient by the force of a reaction medium flowing axially through the media port in order to change the useful flow cross section of the media port. In this way, the equal distribution is optimized by a plurality of bending or flipping lamellas along the particular main duct, created by the flush stacked arrangement of the media ports of the single cells.

It is advantageous to have different—especially discrete—states for the lamella, which adjusts the useful flow cross section of the media port. It is therefore advantageous for the lamella to be adjustable in dependence on the force of the flowing operating medium acting on it between a flipped over configuration, in which there is an increased useful flow cross section of the media port, and a nondeflected configuration, in which there is a reduced useful flow cross section of the media port as compared to the increased useful flow cross section of the media port.

In order to maintain the slight axial extension of the fuel cell stack, it is advantageous for the membrane electrode assembly of the single cell to be encased in an insulating layer, and for the lamella to form part of this insulating layer.

This makes it possible for the insulating layer to be a frame surrounding the membrane electrode assembly and/or a sealing layer (such as a so-called "sub-gasket" or RIM) surrounding the membrane electrode assembly. These components are present any way in a fuel cell, so that thanks to the additional use of a lamella to influence the useful flow cross section of the main duct or the media port no further constituents or components need to be provided.

The lamella can be formed in easy manner if at least one slit open on one side is made in the portion of the insulating layer which protrudes into the useful flow cross section of the media port.

With only one open slit, it is possible to create two half-lamellas protruding into the media port, for example.

Yet it is preferable to make two slits running parallel to each other and open on one side in the portion of the insulating layer which protrudes into the useful flow cross section of the media port, because in this way a "flipping over" of the lamellas by the force of the flowing operating medium is favored.

In order to adjust the useful flow cross section in a targeted manner, it has proven to be advantageous for the lamella to comprise a concave section, which protrudes into the useful flow cross section of the media port. It is likewise possible to form a convex section protruding into the flow cross section. The use of other geometries favoring an even distribution through the stack is likewise possible.

In order to increase the number of equal parts in the fuel cell stack, it has proven to be advantageous for the flow field of the single plate or the bipolar plate to be fluidically connected to media ports at the inlet side and fluidically connected to a media port at the outlet side, and for the media ports on the inlet side and the outlet side to be formed with the same dimensions. In this way, highly symmetrical single cells can be produced, in which preferably also a plurality, especially all of the lamellas present are formed with the same dimensions.

The benefits, advantageous embodiments and effects explained in connection with the single cell according to this disclosure hold equally for the fuel cell stack according to embodiments of the invention, which is formed with a plurality of such single cells, in which the media ports are oriented flush with each other. It is also characterized by an improved equal distribution of the operating media across the main ducts formed by the media ports.

It is possible for the lamellas of the single cells to be dimensioned such that the lamella of a first single cell upon being flipped over due to a force is braced against the lamella of the stacked single cell adjacent to the first single cell. In this way, the lamellas are thus braced against each other, and there is an increasing cluster of lamellas with increasing distance from the media port in the flow direction of the operating medium. Thanks to this clustering of the lamellas, the flow cross section increasingly narrows, which bring a positive effect on the equal distribution. At the same time, such a configuration can achieve an additional lateral sealing due to overlapping lamellas.

The features and combinations of features mentioned above in the description as well as the features and combinations of features mentioned below in the description of the figures and/or shows solely in the figures can be used not only in the particular indicated combination, but also in other combinations or standing alone. Thus, embodiments not shown or explained explicitly in the figures, yet deriving and producible from the explained embodiments by combinations of features shall also be deemed to be encompassed and disclosed herein.

BRIEF DESCRIPTION OF THE SEVERAL VIEWS OF THE DRAWINGS

Further benefits, features and details of embodiments of the invention will emerge from the following description and the drawings.

FIG. 1 shows a schematic representation of a fuel cell stack comprising a plurality of fuel cells with the single cells showing the main ducts, FIG. 2 shows a schematic representation of section II-II through the active region of the fuel cell stack of FIG. 1.

DETAILED DESCRIPTION

Figure 3:
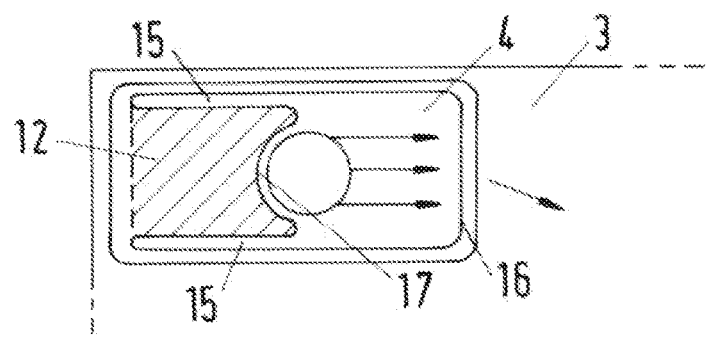
FIG. 3 shows a schematic detail view of a media port at the inlet side of one of the single cells, in which the arrows illustrate the media flow or the media channeling.

A fuel cell stack 1 shown in FIG. 1 comprises a plurality of fuel cells 2 stacked in a row. Each of the fuel cells 2 comprises an anode and a cathode as well as a proton-conducting membrane separating the anode from the cathode. The two electrodes together with the membrane form a membrane electrode assembly 7 (MEA). The membrane is formed from an ionomer, such as a sulfonated tetrafluorethylene polymer (PTFE) or a polymer of perfluorinated sulfonic acid (PFSA). Alternatively, the membrane can be formed as a sulfonated hydrocarbon membrane.

Through anode spaces inside the fuel cell stack 1 fuel is supplied to the anodes (for example, hydrogen). In a polymer electrolyte membrane fuel cell (PEM fuel cell), fuel or fuel molecules are split into protons and electrons at the anode. The membrane lets through the protons (for example, $H^+$), but it not permeable to the electrons ($e^-$). At the anode the following reaction occurs: $2H_2 \rightarrow 4H^+ + 4e^-$ (oxidation/electron surrender). While the protons pass through the membrane to the cathode, the electrons are taken by an external circuit to the cathode or to an energy accumulator. Through cathode spaces inside the fuel cell stack 1 the cathodes can be supplied with cathode gas (such as oxygen or air containing oxygen), so that the following reaction occurs at the cathode side: $O_2 + 4H^+ + 4e^- \rightarrow 2H_2O$ (reduction/electron uptake).

Air compressed by a compressor is supplied to the fuel cell stack 1 by a cathode fresh gas line. In addition, the fuel cell stack 1 is connected to a cathode exhaust gas line. At the anode side, hydrogen kept in a hydrogen tank is supplied to the fuel cell stack 1 by an anode fresh gas line in order to provide the reactants needed for the electrochemical reaction in a fuel cell 2. These gases are handed over to bipolar plates 3, which comprise main ducts from media ports 4 for the distribution of the gases to the membrane and the exit line. In addition, the bipolar plates comprise main coolant ducts from media ports 5 for the channeling of a cooling medium in a coolant duct 6, so that three different media are carried in the smallest of spaces. Thus, FIG. 1 also shows the main ducts 4, 5, each time assembled in pairs, of a plurality of fuel cells 2 with bipolar plates 3, forming the fuel cell stack 1. The membrane electrode assembly 7 together with its associated bipolar plate 3 forms a single cell of the fuel cell stack 1.

A detail cutout view of the fuel cell stack 1 along the sectioning line II-II of FIG. 1 is shown in FIG. 2. This sectioning line runs through the active region 13 of the fuel cell stack 1. The active region 13 of the bipolar plate 3 is naturally not itself electrochemically active, but it is situated next to those constituents of the fuel cell 2 in which the electrochemical fuel cell reaction occurs, namely, on or through the membrane electrode assembly 7. It can be noticed that the bipolar plate 3 has reactant flow fields on its surfaces facing away from each other in this active region 13, being situated opposite each other and thus forming an opposite configuration. The reactant flow fields each comprise a plurality of flow ducts 9 for the particular reaction medium, bounded by walls 11 of webs 10. The webs 10 and the flow ducts 9 of one of the single plates 8 are thus configured to run opposite the webs 10 and the flow ducts 9 of the other of the single plates 8 in this active region 13. In this way, coolant ducts 6 are formed for a coolant flow field extending between the single plates 8.

It is necessary for the operating media to be introduced with the most equal possible distribution into the active region 13 of the bipolar plate 3, and therefore it is known how to introduce a distribution region 14 having a distribution field with ducts between the media ports 4, 5 forming the main ducts and the active region 13. The ducts have suitable branching points for the channeling of the operating media. Downstream from the active region 3, i.e., downstream from the respective flow field, the partial media flows are again collected in a collection region 18 and taken out through the media port 4, 5 at the outlet side.

In order to achieve a uniform flow by the operating media through the main ducts, the media ports 4, 5—at least at the inlet side—provide for the use of at least one lamella 12. This is situated lateral or sideways with respect to the membrane electrode assembly 7 and covers the useful flow cross section of the media port 4, 5 at least partially. The lamella 12 is elastically bendable or elastically resilient in order to change the useful flow cross section of the media port 4, 5 by the force of a reaction medium flowing axially through the media port 4, 5.

Detail views of the upper left media port 4 of the fuel cell stack 1 of FIG. 1 are presented in FIGS. 3 to 6. The membrane electrode assembly 7 here is encased in an insulating layer, at present in a frame 16, and the lamella 12 forms part of the frame 16. It could also be part of a sealing structure (a "sub-gasket" or RIM).

In the configuration of FIG. 3, two slits 15 running parallel to each other and open at one side have been made in the frame 16, protruding into the useful flow cross section of the media port 4, 5. These two slits 15 form the lamella 12, which is elastically bendable and in particular can flip over into and out from the plane of the drawing. It can be seen that the lamella 12 is provided with a concave section 17, which protrudes into the useful flow cross section of the media port 4, 5, and which serves for producing the desired flow resistance. A different shape to produce a different desired flow resistance is likewise possible.

Figure 4:
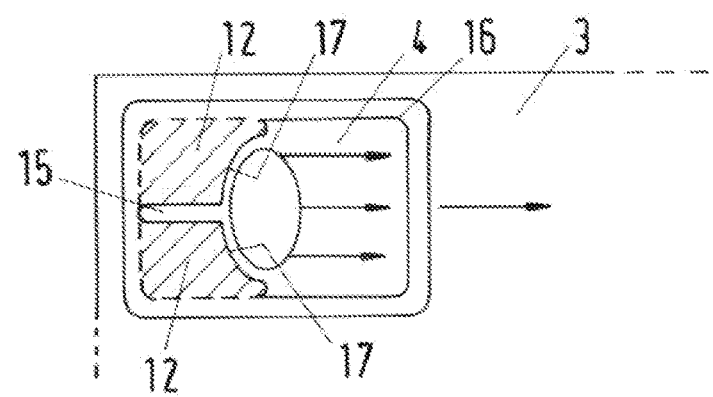
FIG. 4 shows a schematic detail view of another media port at the inlet side of one of the single cells, in which the arrows illustrate the media flow or the media channeling.
Figure 5:
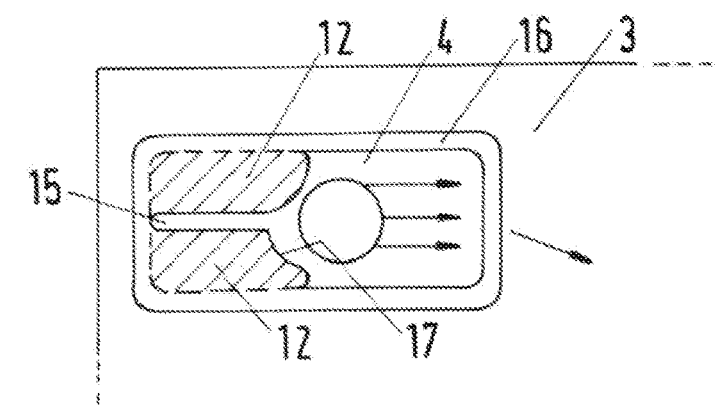
FIG. 5 shows a schematic detail view of another media port at the inlet side of one of the single cells, in which the arrows illustrate the media flow or the media channeling.

In the configuration of FIG. 4 there is exactly one slit 15, being oriented in the present case centrally with regard to the middle of the media port, so that two smaller (partial) lamellas 12 are formed on the left side and right side. Here as well the possibility of the two lamellas 12 being provided with a concave section 17 is shown, protruding into the useful flow cross section of the media port 4, 5. The shape of the lamellas 12 in FIG. 5 corresponds to the shape of the lamellas 12 in FIG. 4, with the exception that the upper lamella 12 in the drawing has no concave section 17. Instead, it is provided with a rather convex shape.

Figure 6:
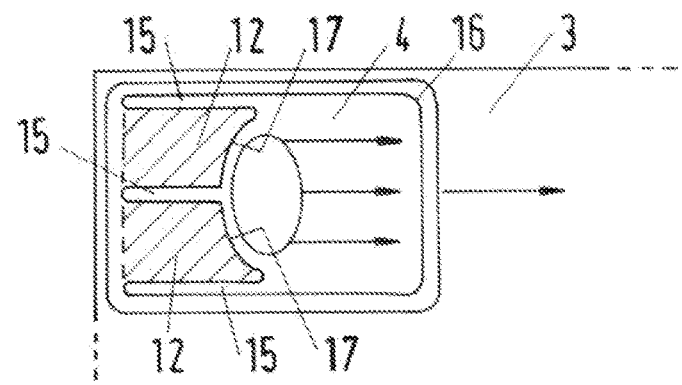
FIG. 6 shows a schematic detail view of another media port at the inlet side of one of the single cells, in which the arrows illustrate the media flow or the media channeling.

FIG. 6 shows a configuration of the lamellas 12 which are formed by two side slits 15—as in the configuration of FIG. 3—and by one central slit 15—as in the configuration of FIG. 4. Here as well there are concave sections 17 on the two lamellas 12.

Depending on the particular boundary conditions, the proportion of the covering by the lamella 12 to the lamella-free cut out media port 4, 5 can be adjusted and varied specifically, in order to optimize the equal distribution for the particular fuel cell stack 1. The dimensions and the shaping of the lamellas 12 will be specifically adapted to the material thickness of the insulating and mechanical properties of the frame (the frame of the MEA).

Figure 7:
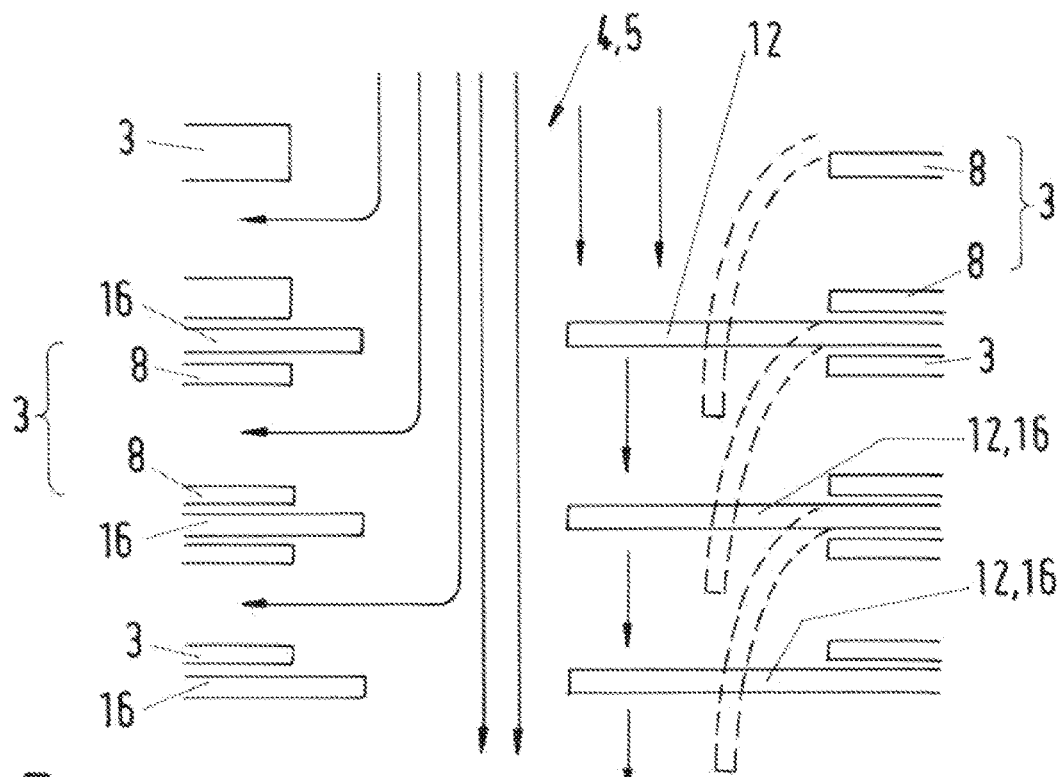
FIG. 7 shows a schematic detail sectional view through a fuel cell stack in the region of the main duct.

In the detail sectional view of FIG. 7 through a fuel cell stack 1 which is formed by a plurality of such single cells stacked one on top of another it can be seen that the media ports 4, 5 are oriented flush in order to form the main ducts. The lamellas 12 when not washed by a flow protrude horizontally in the image into the main ducts formed by the media ports 4, 5. If the lamellas 12 are washed by a flow of an operating medium, they will bend elastically, as shown by the hatched representation. It is preferable for the lamellas 12 to be adjustable in dependence on the force of the flowing operating medium acting on them between a flipped over configuration, in which there is an increased useful flow cross section of the media port 4, 5, and a nondeflected configuration, in which there is a reduced useful flow cross section of the media port 4, 5 as compared to the increased useful flow cross section.

Figure 8:
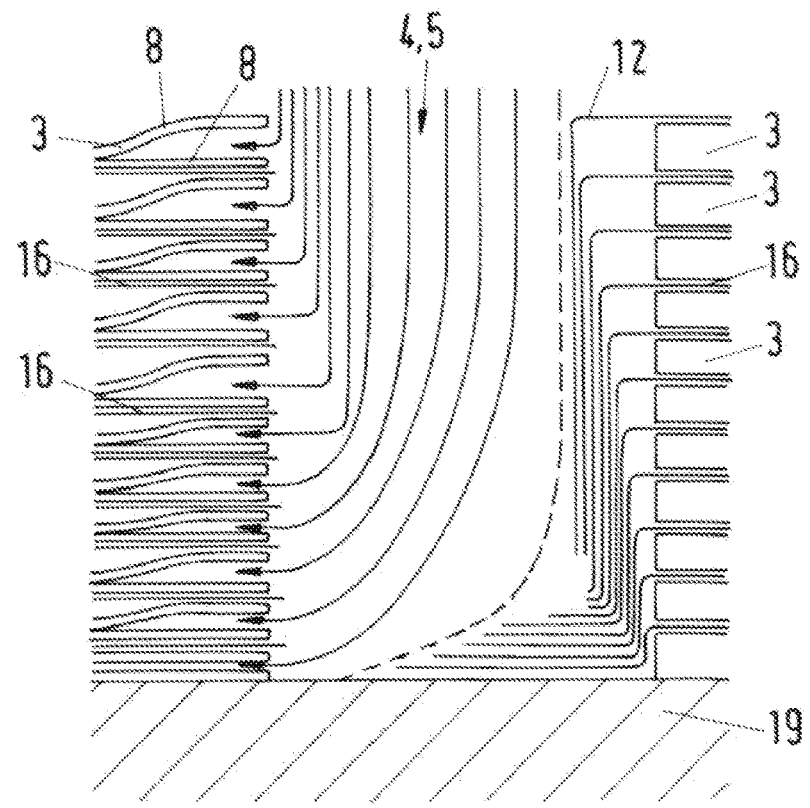
FIG. 8 shows another schematic detail sectional view through a fuel cell stack in the region of the main duct.

The cross section view of FIG. 8 shows that the lamellas 12 of the single cells are dimensioned such that the lamella 12 of a first single cell upon being flipped over due to a force is braced against the lamella 12 of the stacked single cell adjacent to the first single cell. In this way, the lamellas 12 are thus braced against each other, and there is an increasing cluster of lamellas 12 with increasing distance from the media port in the flow direction of the operating medium. Thanks to this clustering of the lamellas 12, the useful flow cross section of the main duct increasingly narrows, which favors the equal distribution of the flowing operating medium. At the same time, such a configuration can achieve an additional lateral sealing due to overlapping lamellas 12. The lamellas 12 have identical dimensions in the present case. A specific dimensioning which varies along the stack is likewise conceivable for the lamellas 12. FIG. 8 also shows an end plate 19.

As a result, with embodiments of the present invention there is an equal distribution of the media flows already in the main duct, so that there is an improved media distribution over the entire bipolar plate 3, over the entire single cell, and thus over the entire fuel cell stack 1.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:
1. A single cell for a fuel cell stack, comprising:
   an active region;
   a media port present on a side away from the active region;
   at least one plate formed with a flow field to supply an operating medium to the active region, which flow field is fluidically connected to the media port;
   a membrane electrode assembly arranged in the active region adjacent to the at least one plate, and a lamella provided lateral to the membrane electrode assembly, wherein the lamella extends laterally to at least partly cover a flow cross section of the media port, and wherein the lamella is formed to be elastically bendable by a force of the operating medium flowing axially through the media port during operation of the fuel cell stack in order to change a useful flow cross section of the media port as the lamella bends during operation.

2. The single cell according to claim 1, wherein the lamella is adjustable in dependence on the force of the operating medium flowing axially through the media port acting on the lamella between a deflected configuration, in which there is an increased useful flow cross section of the media port, and a nondeflected configuration, in which there is a reduced useful flow cross section of the media port as compared to the increased useful flow cross section.

3. The single cell according to claim 1, wherein the membrane electrode assembly is encased in an insulating layer, and the lamella forms part of the insulating layer.

4. The single cell according to claim 3, wherein the insulating layer is a frame surrounding the membrane electrode assembly and/or a sealing layer surrounding the membrane electrode assembly.

5. The single cell according to claim 3, wherein in order to form the lamella at least one slit open on one side is made in a portion of the insulating layer which protrudes into the useful flow cross section of the media port.

6. The single cell according to claim 5, wherein two slits running parallel to each other and open on one side are made in the portion of the insulating layer which protrudes into the useful flow cross section of the media port.

7. The single cell according to claim 1, wherein the lamella comprises a concave section, which protrudes into the useful flow cross section of the media port.

8. The single cell according to claim 1, wherein the flow field is fluidically connected to one or more media ports at an inlet side and fluidically connected to one or more media ports at an outlet side, the one or more media ports at the inlet side and the one or more media ports at the outlet side being formed with the same dimensions.

9. A fuel cell stack comprising a plurality of single cells according to claim 1, in which the media ports are oriented flush with each other.

10. The fuel cell stack according to claim 9, wherein lamellas of the single cells are dimensioned such that the lamella of a first one of the plurality of single cells when deflected by force is braced against the lamella of a second one of the plurality of single cells that is adjacent to the first one of the plurality of single cells.

* * * * *